US008578610B2

(12) United States Patent
Hori et al.

(10) Patent No.: US 8,578,610 B2
(45) Date of Patent: Nov. 12, 2013

(54) METHOD FOR MANUFACTURING FLUID DYNAMIC BEARING DEVICE

(75) Inventors: Masaharu Hori, Kuwana (JP); Tetsuya Yamamoto, Kuwana (JP)

(73) Assignee: NTN Corporation, Osaka-shi, Osaka (JP)

( * ) Notice: Subject to any disclaimer, the term of this patent is extended or adjusted under 35 U.S.C. 154(b) by 837 days.

(21) Appl. No.: 12/595,198

(22) PCT Filed: Mar. 24, 2008

(86) PCT No.: PCT/JP2008/055380
§ 371 (c)(1),
(2), (4) Date: Oct. 8, 2009

(87) PCT Pub. No.: WO2008/132908
PCT Pub. Date: Nov. 6, 2008

(65) Prior Publication Data
US 2010/0132197 A1    Jun. 3, 2010

(30) Foreign Application Priority Data

Apr. 23, 2007 (JP) ................................. 2007-113149

(51) Int. Cl.
*B21D 53/10* (2006.01)
(52) U.S. Cl.
USPC ...................................................... 29/898.02
(58) Field of Classification Search
USPC ...................................................... 29/898.02
See application file for complete search history.

(56) References Cited

U.S. PATENT DOCUMENTS

| 6,921,208 B2 | 7/2005 | Yamashita et al. |
| 7,146,733 B2 | 12/2006 | Yamashita et al. |
| 2003/0169952 A1 | 9/2003 | Yamashita et al. |
| 2005/0044714 A1 | 3/2005 | Yamashita et al. |

FOREIGN PATENT DOCUMENTS

| JP | 8-200354 A | 8/1996 |
| JP | 2002-061637 A | 2/2002 |
| JP | 2002-139029 A | 5/2002 |
| JP | 2003-239951 A | 8/2003 |
| JP | 2003-239974 A | 8/2003 |
| JP | 2004-316926 A | 11/2004 |
| JP | 2006-342975 A | 12/2006 |
| JP | 2007-051782 A | 3/2007 |

OTHER PUBLICATIONS

Notification of Transmittal of Translation of the International Preliminary Report on Patentability (Form PCT/IB/338) of International Application No. PCT/JP2008/055380 mailed Nov. 19, 2009 with Forms PCT/IB/373, PCT/IB/326 and PCT/ISA/237.
Japanese Office Action dated May 31, 2012, issued in corresponding Japanese Patent Application No. 2007-113149, with Partial translation (4 pages).
International Search Report for PCT/JP2008/055380, mailing date of Jun. 10, 2008.

*Primary Examiner* — David Bryant
*Assistant Examiner* — Moshe Wilensky
(74) *Attorney, Agent, or Firm* — Westerman, Hattori, Daniels & Adrian, LLP

(57) ABSTRACT

Easy and precise setting of a predetermined thrust bearing gap is made possible.
An axial gap 13 having a dimension that is equal to the sum of two thrust bearing gaps is first provided between the flange part 2b of the shaft member 2 and the bearing member or bearing sleeve 8. The shaft member 2 and the bearing sleeve 8 are accommodated inside the housing 7 with this gap dimension δ being kept, and the bearing sleeve 8 is secured to the housing 7.

4 Claims, 6 Drawing Sheets

METHOD FOR MANUFACTURING FLUID DYNAMIC BEARING DEVICE

TECHNICAL FIELD

The present invention relates to a method for manufacturing a fluid dynamic bearing device.

BACKGROUND ART

A fluid dynamic bearing device is a bearing device that rotatably supports an shaft member in a non-contact manner by the action of dynamic pressure generated by a lubrication fluid in a bearing gap. High-speed rotation, high rotation precision, and low noise are the characteristic features of the fluid dynamic bearing device. Owing to these characteristics, it has been favorably used recently as the bearing device for motors mounted in information equipment and various other electrical equipment, more specifically, for the spindle motors of HDDs or other magnetic disk devices, CD-ROMs, CD-R/RWs, DVD-ROM/RAMS or other optical disk devices, MDs, MOs or other magnetic optical disk devices, for the polygon scanner motors of laser beam printers (LBP), and for fan motors.

FIG. 7 shows a known structure of a fluid dynamic bearing device incorporated in a spindle motor of a disk device or the like. The fluid dynamic bearing device 71 shown in the drawing includes a cylindrical housing 77 with an integral bottom, a bearing member or a bearing sleeve 78 secured to the inner circumference of the housing 77, and an shaft member 72 whose shaft part 72a is inserted into the bearing sleeve 78. Between the inner circumferential surface of the bearing sleeve 78 and the outer circumferential surface of the shaft part 72a are formed radial bearing gaps of radial bearing parts 73 and 74 at two, upper and lower, spaced-apart locations. First and second thrust bearing surfaces are provided respectively on both end faces of a flange part 72b at one end of the shaft part 72a. The first thrust bearing surface forms a thrust bearing gap (being a first thrust bearing gap) of a first thrust bearing part 75 between itself and one end face of the bearing sleeve 78, and the second thrust bearing surface forms a thrust bearing gap (being a second thrust bearing gap) of a second thrust bearing part 76 between itself and the inner bottom face of the housing 77.

With the fluid dynamic bearing device 71 having the above structure, axial positioning of the bearing sleeve 78 relative to the housing 77, i.e., setting of a predetermined gap dimension of the two thrust bearing gaps, is achieved for example in the following manner: The shaft member 72 and the bearing sleeve 78 are set inside the housing 77 such that the sum of both thrust bearing gaps is zero; the shaft member 72 is then moved towards the opening side of the housing 77 by a distance that is equal to the sum of both thrust bearing gaps; finally, the bearing sleeve 78 is secured to the housing 77 (see, for example, Patent Document 1).

[Patent Document 1] Japanese Patent Application Laid-Open No. 2003-239974

DISCLOSURE OF THE INVENTION

Problems to be Solved by the Invention

The technique shown in Patent Document 1 achieves a predetermined gap dimension of both thrust bearing gaps by controlling the amount of movement of the shaft member or the bearing sleeve in the axial direction. However, the amount of movement of the shaft member or the like may not necessarily be equal to the sum of both thrust bearing gaps. Accordingly, it is difficult to precisely achieve the correct gap dimension of both thrust bearing gaps.

The present invention was devised in view of the problem above, and an object of the present invention is to provide a method for manufacturing a fluid dynamic bearing device, with which a predetermined gap dimension of two thrust bearing gaps is achieved easily and precisely.

Means for Solving the Problems

To solve the above problem, the present invention provides a method for manufacturing a fluid dynamic bearing device including a step of assembling the fluid dynamic bearing device that includes a housing, a bearing member fixed to an inner circumference of the housing, an shaft member inserted into the bearing member, and two thrust bearing gaps formed opposite the shaft member, the method being characterized in that, after providing an axial gap having a dimension that is equal to the sum of the two thrust bearing gaps between the shaft member and the bearing member, the shaft member and the bearing member are accommodated inside the housing with this gap dimension being maintained, and the bearing member is fixed to the housing.

As described above, the characteristic feature of the method for manufacturing a fluid dynamic bearing device according to the present invention is that an axial gap having a dimension that is equal to the sum of the two thrust bearing gaps is provided between the shaft member and the bearing member, and with this gap dimension being maintained, the bearing member is fixed to the housing. With such a method, the gap setting of the two thrust bearing gaps is performed outside the housing, i.e., the gap dimension is directly controlled from outside the housing. Accordingly it is possible to achieve a predetermined gap dimension of the two thrust bearing gaps easily and precisely.

The present invention further provides a method for manufacturing a fluid dynamic bearing device including a process step of assembling the fluid dynamic bearing device that includes a housing having an integrally formed bottom, a bearing member fixed to an inner circumference of the housing, and a shaft member inserted into the bearing member, the shaft member having a first thrust bearing surface that forms one thrust bearing gap between itself and the bearing member and a second thrust bearing surface that forms the other thrust bearing gap between itself and the bottom of the housing, the method being characterized in that, after providing an axial gap having a dimension that is equal to the sum of the two thrust bearing gaps between the first thrust bearing surface and the bearing member, the shaft member and the bearing member are accommodated inside the housing with this gap dimension being maintained, and the bearing member is fixed to the housing at the time point when the second thrust bearing surface makes contact with the bottom of the housing. Note, the "(first and second) thrust bearing surfaces" shall simply mean the surfaces that face the thrust bearing gaps, whether provided or not with dynamic pressure generating part such as dynamic pressure generating grooves.

As described above, according to the present invention, an axial gap having a dimension that is equal to the sum of the two thrust bearing gaps is provided between the first thrust bearing surface of the shaft member and the bearing member, and with this gap dimension being maintained, the bearing member is fixed to the housing. That is, the gap setting of the two thrust bearing gaps is performed outside the housing, i.e., the gap dimension is directly controlled from outside the housing. To precisely achieve a predetermined gap of two thrust bearing gaps with the conventional method, it is necessary, in a reference setup step, to make sure that the second thrust bearing surface of the shaft member abuts the inner bottom face of the housing and that one end face of the bearing member abuts the first thrust bearing surface of the shaft member. However, whether they abut or not cannot be checked with eyes, because of which the bearing member was often pressed towards the bottom of the housing too much. This caused damage to the dynamic pressure generating part such as dynamic pressure generating grooves which may be provided on the inner bottom face of the housing or on one end face of the bearing member, leading to the problem of lowered rotation precision in the thrust direction caused by damaged dynamic pressure generating part. Compared to this, according to the method of the present invention, since the gap dimension is directly controlled from outside the housing as described above, it is unlikely that, in the reference setup step, too much force is applied to both thrust bearing surfaces of the shaft member, one end face of the bearing member, and the inner bottom face of the housing. Accordingly, deterioration of surface precision of these faces and damage to the dynamic pressure generating part are prevented, and the above-noted problems are avoided.

Moreover, in the conventional method, the first thrust bearing surface of the shaft member is engaged with one end face of the bearing member so as to move the bearing member in the axial direction. If, in particular, the bearing member is tight-fit (press-fit) to the housing, it would be difficult to move the bearing member smoothly because of relatively large friction resistance between itself and the housing, which may lead to possible deformation of the flange part or other parts. If, in particular, one of the above-noted two surfaces is formed with dynamic pressure generating part, this may lead to possible damage to such dynamic pressure generating part. Compared to this, such deformation or damage to the dynamic pressure generating part can be avoided by fixing the bearing member to the housing at the time point when the second thrust bearing surface of the shaft member makes contact with the bottom face of the housing, with the predetermined axial gap being maintained between the first thrust bearing surface of the shaft member and the bearing member, as described above.

Commonly, the housing is made of a metal material, in consideration of the strength against impact load applied to the housing bottom and the bonding strength to the motor bracket. However, press-fitting of the bearing member into such metal housing may cause the inner circumferential surface of the bearing member to follow the contour of the inner circumferential surface of the housing because of the housing's higher rigidity, which may result in deterioration of dimensional precision of the radial bearing gap. The deterioration may also be brought about by press-fitting gap variations. Therefore, in either case of fixing the bearing member inside the housing mentioned above, it is preferable to bond (secure) the bearing member to the housing with a gap fit. Thereby, even if the housing is made of a metal material, deformation of the inner circumferential surface of the bearing member is avoided, i.e., deterioration of dimensional precision of the radial bearing gap is avoided.

Effect of the Invention

With the method for manufacturing a fluid dynamic bearing device according to the present invention, as described above, a predetermined gap dimension of the two thrust bearing gaps is achieved easily and precisely. Accordingly, the invention provides a fluid dynamic bearing device that is excellent in rotation precision in both thrust directions.

BEST MODE FOR CARRYING OUT THE INVENTION

Preferred embodiments of the present invention will be hereinafter described with reference to the drawings.

FIG. 1 is a conceptual view illustrating one example structure of a spindle motor for information equipment in which a fluid dynamic bearing device is incorporated. The spindle motor is used in a disk drive device such as an HDD, and includes a fluid dynamic bearing device 1 for rotatably supporting a shaft member 2 in a non-contact manner, a disk hub 3 mounted on the shaft member 2, and a stator coil 4 and a rotor magnet 5 arranged opposite each other and separated by a gap, for example, in a radial direction. The stator coil 4 is attached to the outer circumference of a bracket 6, while the rotor magnet 5 is attached to the inner circumference of the disk hub 3. The housing 7 of the fluid dynamic bearing device 1 is mounted to the inner circumference of the bracket 6. The disk hub 3 holds one or a plurality of disks D such as magnetic disks or the like. Power application to the stator coil 4 generates an electromagnetic force between the stator coil 4 and the rotor magnet 5, which rotates the rotor magnet 5, thereby rotating the disk hub 3 and the shaft member 2 together.

FIG. 2 illustrates one embodiment of the fluid dynamic bearing device according to the present invention. This fluid dynamic bearing device 1 includes, as major constituent elements, the housing 7 having a side part 7a and a bottom part 7b integrally formed so that it is cylindrical and has a bottom, a bearing member or a bearing sleeve 8 secured to the inner circumference of the housing 7, a shaft member 2 inserted into the bearing sleeve 8, and a seal member 9 sealing the opening of the housing 7. The interior space of the fluid dynamic bearing device 1 is filled with a lubrication fluid or lubricating oil. The opening side of the housing 7 will be described as the upper side and the axially opposite side as the lower side in the following description for ease of explanation.

In the illustrated fluid dynamic bearing device 1, a first radial bearing part R1 and a second radial bearing part R2 are provided between the inner circumferential surface 8a of the bearing sleeve 8 and the outer circumferential surface 2a1 of a shaft part 2a of the shaft member 2 at axially spaced-apart locations. A first thrust bearing part T1 is provided between the lower end face 8b of the bearing sleeve 8 and the upper end face 2b1 of a flange part 2b of the shaft member 2, and a second thrust bearing part T2 is provided between the inner bottom face 7c1 of the housing 7 and the lower end face 2b2 of a flange part 2b.

The shaft member 2 is made of a metal material such as stainless steel or the like, and includes the shaft part 2a and the flange part 2b at the bottom of the shaft part 2a which can either be integral with the shaft or a separate component. The shaft member 2 may be entirely made of a metal material, or may have a hybrid structure using both metal and plastic, for example, with the flange part 2b being entirely or partly (e.g., both end faces) made of plastic.

The bearing sleeve 8 is formed cylindrical and made of a porous sintered metal material, in particular, a porous sintered metal material mainly composed of copper. The material is not limited to sintered metal; the bearing sleeve 8 may be made of other non-porous metals, for example a soft metal such as brass.

In the inner circumferential surface 8a of the bearing sleeve 8 and in the outer circumferential surface 2a1 of the shaft part $2a$, two, upper and lower, axially spaced-apart regions are provided which will form the radial bearing surfaces of the first radial bearing part R1 and the second radial bearing part R2. In the present embodiment, the radial bearing surface of the bearing sleeve 8 (black solid parts in FIG. 2) is formed with dynamic pressure generating grooves $8a1$ and $8a2$, for example, in a herringbone pattern as shown in FIG. 3, as dynamic pressure generating parts. The upper dynamic pressure generating grooves $8a1$ are formed asymmetrical with respect to the axial center m (axial center of the region between the upper and lower diagonal grooves), with the upper region above the axial center m having a larger axial dimension X1 than the axial dimension X2 of the lower region. The dynamic pressure generating grooves may be formed in the radial bearing surface of the outer circumferential surface $2a1$ of the shaft part $2a$, and the pattern may be spiral or any other known shapes. One or a plurality of axial grooves $8d1$ are formed on the outer circumferential surface $8d$ of the bearing sleeve 8 so as to communicate both end faces $8b$ and $8c$. In the present embodiment, the axial grooves $8d1$ are arranged at three circumferentially equally spaced locations.

The lower end face $8b$ of the bearing sleeve 8 and the upper end face $2b1$ of the flange part $2b$ have regions allotted to the first thrust bearing surface for forming the first thrust bearing part T1. In the present embodiment, the first thrust bearing surface in the lower end face $8b$ of the bearing sleeve 8 (black solid parts in FIG. 2) is formed with dynamic pressure generating grooves (not shown), for example, in a spiral pattern, as dynamic pressure generating parts. The dynamic pressure generating grooves may be formed in the upper end face $2b1$ of the flange part $2b$ and the pattern may be herringbone or any other known shapes.

The housing 7 is press-formed from, for example, brass, an aluminum alloy, or other soft metal materials, and has a side part and a bottom part $7c$ integral with the side part and sealing the lower end opening of the side part. The side part is composed of a cylindrical small-diameter part $7a$ and a cylindrical large-diameter part $7b$ above the small-diameter part $7a$. The inner and outer circumferential surfaces $7a1$ and $7a2$ of the small-diameter part $7a$ are smaller in diameter than the inner and outer circumferential surfaces $7b1$ and $7b2$ of the large-diameter part $7b$. The inner circumferential surface $7a1$ of the small-diameter part $7a$ and the inner circumferential surface $7b1$ of the large-diameter part $7b$ are continuous with each other via a stepped surface $7e$, which is a flat surface formed in a direction orthogonal to the axial direction. In the present embodiment, the inner circumferential surface $7a1$ of the small-diameter part $7a$ is formed with a larger diameter than the outside diameter of the bearing sleeve 8, so that the bearing sleeve 8 is attached to the inner circumferential surface $7a1$ of the small-diameter part $7a$ with a gap fit. The housing 7 need not be a press-formed component, and may be a machined or forged part of stainless steel or the like, or a metal injection molded part of a mixture of metal powder and binder (i.e., MIM part).

The inner bottom face $7c1$ of the housing 7 and the lower end face $2b2$ of the flange part $2b$ have regions allotted to the second thrust bearing surface for forming the second thrust bearing part T2. In the present embodiment, the second thrust bearing surface in the inner bottom face $7c1$ of the housing 7 (black solid parts in FIG. 2) is formed with dynamic pressure generating grooves (not shown), for example, in a spiral pattern, as dynamic pressure generating parts. These dynamic pressure generating grooves are molded during the press forming of the housing using a press mold having a pattern conforming to the groove shape in the region that will form the inner bottom face $7c1$. The dynamic pressure generating grooves may be formed in the lower end face $2b2$ of the flange part $2b$ and the pattern may be herringbone or any other known shapes.

The seal member 9 is made, for example, of soft metal materials such as brass or other metal materials, or resin materials. It is a one-piece component with an inverted L-shape cross section, consisting of a ring-like first seal part $9a$ and a cylindrical second seal part $9b$ extending downwardly from around the first seal part $9a$. The lower end face $9a1$ of the first seal part $9a$ abuts the upper end face $8c$ of the bearing sleeve 8, while the lower end face of the second seal part $9b$ is separated from the opposite stepped surface $7e$ of the housing 7 by an axial gap 11.

A first seal space S1 having a predetermined volume is provided between the inner circumferential surface $9a2$ of the first seal part $9a$ and the outer circumferential surface $2a1$ of the shaft part $2a$. Also a second seal space S2 having a predetermined volume is provided between the outer circumferential surface $9b1$ of the second seal part $9b$ and the inner circumferential surface $7b1$ of the large-diameter part $7b$ of the housing 7. In the present embodiment, the inner circumferential surface $9a2$ of the first seal part $9a$ and the inner circumferential surface $7b1$ of the large-diameter part $7b$ of the housing 7 are both formed as tapered surfaces upwardly increasing in diameter, so that the first and second seal spaces S1 and S2 are downwardly tapering.

The lower end face $9a1$ of the first seal part $9a$ is formed with one or a plurality of radial grooves 10 that cross the lower end face $9a1$. Although not shown, the radial grooves 10 are arranged at three circumferentially equally spaced locations in the present embodiment.

In the fluid dynamic bearing device 1 having the above structure, when the shaft member 2 rotates, the radial bearing surfaces provided at two, upper and lower, locations on the inner circumferential surface $8a$ of the bearing sleeve 8 face the outer circumferential surface (radial bearing surface) $2a1$ of the shaft part $2a$ via a radial bearing gap, respectively. As the shaft member 2 rotates, the stiffness of the oil film formed in each radial bearing gap is increased by the action of dynamic pressure generated by the dynamic pressure generating grooves $8a1$ and $8a2$ and the pressure thus generated radially and rotatably supports the shaft member 2 in a non-contact manner. Thus the first radial bearing part R1 and the second radial bearing part R2 are formed, which radially and rotatably support the shaft member 2 in a non-contact manner.

During rotation of the shaft member 2, the first thrust bearing surface formed on the lower end face $8b$ of the bearing sleeve 8 faces the first thrust bearing surface on the upper end face $2b1$ of the flange part $2b$ via a first thrust bearing gap, and the second thrust bearing surface formed on the inner bottom face $7c1$ of the housing 7 faces the second thrust bearing surface on the lower end face $2b2$ of the flange part $2b$ via a second thrust bearing gap. As the shaft member 2 rotates, the stiffness of the oil film formed in the first and second thrust bearing gaps is increased by the action of dynamic pressure generated by the dynamic pressure generating grooves, and the pressure thus generated rotatably supports the shaft member 2 in both thrust directions in a non-contact manner. Thus the first thrust bearing part T1 is formed, which rotatably supports the shaft member 2 in one thrust direction in a non-contact manner, and the second thrust bearing part T2 is formed, which rotatably supports the shaft member 2 in the other thrust direction in a non-contact manner.

Also, during rotation of the shaft member 2, the lubricating oil inside both seal spaces S1 and S2 is drawn in the tapering direction, i.e., into the housing 7, by the capillary action, because of the shape of the first and second seal spaces S1 and S2 gradually tapering into the housing 7 as mentioned above. Therefore, leakage of lubricating oil from inside the housing 7 is effectively prevented. The seal spaces S1 and S2 also have a buffer function of absorbing volume changes of lubricating oil that fills the interior space of the housing 7 caused by temperature changes, so that the oil surface of the lubricating oil always remains within the seal spaces S1 and S2 within the assumed range of temperature changes.

The tapered surface may be formed on the outer circumferential surface 2a1 of the shaft part 2a while the inner circumferential surface 9a2 of the first seal part 9a may have a cylindrical surface. In that case, the first seal space S1 can also function as a centrifugal seal, whereby the sealing effect will be enhanced.

The upper dynamic pressure generating grooves 8a1 formed on the inner circumferential surface 8a of the bearing sleeve 8 is asymmetrical with respect to the axial center m, with the upper region above the axial center m having a larger axial dimension X1 than the axial dimension X2 of the lower region as mentioned above (see FIG. 3). Therefore, when the shaft member 2 is rotating, the upper region of the dynamic pressure generating grooves 8a1 generates a relatively larger force to draw lubricating oil (pumping force) than that of the lower region. This difference in the pumping force causes circulation of the lubricating oil filled in the gap between the inner circumferential surface 8a of the bearing sleeve 8 and the outer circumferential surface 2a1 of the shaft part 2a, through a route connecting the first thrust bearing gap, fluid paths formed by the axial grooves 8d1 of the bearing sleeve 8, and fluid paths formed by the radial grooves 10 of the first seal part 9a, and oil is drawn back into the radial bearing gap of the first radial bearing part R1.

This structure, which causes the lubricating oil to circulate inside the housing 7, keeps good pressure balance of the lubricating oil, prevents air bubble formation caused by local negative pressure, and solves the problems of lubricating oil leakage or vibration arising from the air bubble formation. The circulation route described above communicates with the first seal space S1, and with the second seal space S2 through the axial gap 11. Therefore, should air bubbles enter the lubricating oil for some reason, these bubbles will be released to the outside air from the lubricating oil surface (air liquid interface) in the seal spaces S1 and S2 as they are circulated with the lubricating oil. As a result, adverse effects of air bubbles are effectively prevented.

Although not shown, the axial fluid paths can be formed by providing axial grooves in the inner circumferential surface 7a1 of the small-diameter part 7a of the housing 7 and in the inner circumferential surface 9b2 of the second seal part 9b of the seal member 9. The radial fluid paths can be formed by providing radial grooves in the upper end face 8c of the bearing sleeve 8.

In the fluid dynamic bearing device 1 having the above structure, the seal space is provided not only on the inner side of the seal member 9 but also on its outer side. Since the seal space has a volume that can absorb volume variations of the lubricating oil that fills the interior space of the housing 7 due to temperature changes, according to the structure of the present embodiment, the axial dimension of the first seal space S1 can be decreased as compared to the fluid dynamic bearing device shown in FIG. 7, by the volume of the second seal S2 on the outer side of the seal member 9. This means that the axial length of the bearing sleeve 8, in other words, the bearing span between both radial bearing parts R1 and R2, can be made larger than the structure shown in FIG. 7 without increasing the axial dimension of the bearing device (housing 7), whereby the moment rigidity can be made higher.

The fluid dynamic bearing device 1 of the above structure is assembled through the following process flow. Hereinafter, the process flow will be described with reference to FIG. 4 to FIG. 6, mainly on the process of determining the position of, and securing, the bearing sleeve 8 to a predetermined axial location inside the housing 7, and the process of setting the gap dimension of the first and second thrust bearing gaps.

The process of setting the gap dimension of the first and second thrust bearing gaps consists of a reference setup step (a), an axial gap formation step (b), and a bearing sleeve fixing step (c). The assembling device shown in FIG. 4 to FIG. 6 is used for each of the steps. The device shown in these drawings includes a rotatably arranged cam 22, a pin 21, which is the movable side, with its lower end face 21b abutting on the outer circumferential surface of the cam 22 to be able to move up and down as the cam 22 rotates, and a support table 23, which is the stationary side, held around the pin 21 by suitable means (not shown). In the present embodiment, the cam 22 is an elliptical cam having an elliptical cross section with a long diameter of x1 and a short diameter of x2 (x1>x2). The difference between the long diameter and the short diameter is set equal to the sum of the first and second thrust bearing gaps. It should go without saying that the cam 22 is not limited to elliptical cams but can be other cams that have, for example, a true circle cross section, or a polygonal cross section. While the difference between the long diameter and the short diameter of the cam 22 is illustrated with emphasis for easier understanding, the actual difference is about ten to several tens μm.

(a) Reference Setup Step

In this step, the upper end face 2b1 of the flange part 2b and the lower end face 8b of the bearing sleeve 8, i.e., the opposite surfaces of the first thrust bearing, are abutted each other, to determine a reference point. More specifically, as shown in FIG. 4, the shaft member 2 and the bearing sleeve 8 are set in the assembling device such that the upper end face 2a2 of the shaft part 2a is abutted on the upper end face 21a of the pin 21, and the upper end face 8c of the bearing sleeve 8 is abutted on the upper end face 23b of the support table 23. At this time, the cam 22 is oriented such that its short diameter (x2) is parallel with (coincides with) the axial line.

(b) Axial Gap Formation Step

Next, as shown in FIG. 5, the cam 22 is rotated 90° so that the long diameter (x1) coincides with the axial line. By thus rotating the cam 90°, the pin 21 and the shaft member 2 resting on the pin 21 are pushed up a distance that is equal to the difference between the long diameter and the short diameter (x1−x2) of the cam 22, whereby an axial gap 13 having a dimension δ is formed between the upper end face 2b1 of the flange part 2b and the lower end face 8b of the bearing sleeve 8 (opposite surfaces of the first thrust bearing). Since the difference between the long diameter and the short diameter of the cam 22 is set equal to the sum of the first and second thrust bearing gaps as noted above, the dimension δ of the axial gap 13 is equal to the sum of the first and second thrust bearing gaps (δ=x1−x2).

To prevent the bearing sleeve 8 from following the pushed-up shaft member 2 and moving upwards, a suction means is provided in the present embodiment to suck the bearing sleeve 8 downwards (in the direction of the black arrows in the drawing), so that the upper end face 8c of the bearing sleeve 8 is attached by suction on the upper end face 23b of the support table 23.

(c) Bearing Sleeve Fixing Step

Next, as shown in FIG. 6, the assembly in a state shown in FIG. 5 and the housing 7 which is held by suitable means (not shown) are moved in the axial direction relative to each other, so that the lower end face 2b2 of the flange part 2b and the inner bottom face 7c1 of the housing 7 (opposite surfaces of the second thrust bearing) make contact with each other. The inner circumferential surface 7a1 of the small-diameter part 7a of the housing 7, or the outer circumferential surface 8d of the bearing sleeve 8, has been coated with an adhesive beforehand. With the state shown in FIG. 6 being kept, after the opposite surfaces of the second thrust bearing have made contact with each other, the adhesive is cured. After the curing of the adhesive, the cam 22 is rotated to release pressure that has been applied to the shaft member 2, and the mold is opened, to obtain an assembled product, with the bearing sleeve 8 fixed to the predetermined axial location in the housing 7 with the first and second thrust bearing gaps having the predetermined dimension.

The seal member 9 is then secured to the bearing sleeve 8 by suitable means such as press-fitting, adhesion, or press-fit adhesion, after which the interior space of the housing 7 that is sealed by the seal member 9, including internal pores of the bearing sleeve 8, is filled with the lubricating oil. Thus the fluid dynamic bearing device 1 shown in FIG. 2 is complete.

With the manufacturing method according to the present invention described above, as shown in FIG. 5, after forming an axial gap 13 having a dimension δ that is equal to the sum of both thrust bearing gaps between the upper end face 2b1 of the flange part 2b and the lower end face 8b of the bearing sleeve 8, the bearing sleeve 8 is secured to the housing 7, with this gap dimension being maintained. That is, the gap dimension of the two thrust bearing gaps is directly controlled from outside the housing 7, which enables precise control of the gap dimension. Since the shaft member 2 is supported by the pin 21 and the cam 22 until the assembling is complete, the pressure generated in the axial direction when the lower end face 2b2 of the flange part 2b makes contact with the inner bottom face 7c1 of the housing 7 does not change the dimension δ of the axial gap 13.

With the conventional method for setting the gap of two thrust bearing gaps with good precision, it is necessary to make sure that the lower end face 2b2 of the flange part 2b abuts the inner bottom face 7c1 of the housing 7 and that the lower end face 8b of the bearing sleeve 8 abuts the upper end face 2b1 of the flange part 2b, in the reference setup step. However, whether they abut or not cannot be checked with eyes, because of which the bearing sleeve 8 was often pressed towards the bottom 7c of the housing too much. This caused damage to the dynamic pressure generating grooves on the inner bottom face 7c1 of the housing or on the lower end face 8b of the bearing sleeve 8, leading to the problem of lowered rotation precision in the thrust direction. In contrast, in the method according to the present invention, since the gap dimension is directly controlled from outside the housing 7 as described above, it is unlikely that, in the reference setup step, too much force is applied to both end faces 2b1 and 2b2 of the flange part 2b, the lower end face 8b of the bearing sleeve 8, and the inner bottom face 7c1 of the housing 7. Accordingly, deterioration of surface precision of these faces and damage to the dynamic pressure generating grooves are prevented, and the above-noted problems are avoided.

Moreover, in the conventional method, the upper end face 2b1 of the flange part 2b is engaged with the lower end face 8b of the bearing sleeve 8, after which the bearing sleeve 8 is axially moved by moving the shaft member 2, but if the bearing sleeve 8 is press-fit to the housing 7 as in the present embodiment, it is difficult to move the bearing sleeve 8 smoothly because of relatively large friction resistance during the axial movement. This may lead to possible deformation of the flange part 2b or other parts and also to possible damage to the dynamic pressure generating grooves 8b1 on the lower end face 8b of the bearing sleeve 8. Compared to this, such problems can be avoided by fixing the bearing sleeve 8 to the housing 7 at the time point when the lower end face 2b2 of the flange part 2b makes contact with the inner bottom face 7c1 of the housing 7, with the gap dimension δ of the axial gap 13 being maintained as noted above.

Since the bearing sleeve 8 is attached to the inner circumference of the housing 7 with a gap fit, possible deformation of the inner circumferential surface 8a of the bearing sleeve 8 which may occur during the press-fitting of the sleeve into the housing is avoided, i.e., deterioration of dimensional precision of the radial bearing gap is avoided. Note, the bearing sleeve 8 need not be press-fit into the housing 7, because the upper end face 2a2 of the shaft member 2 and the upper end face 8c of the bearing sleeve 8 are respectively supported by the pin 21 and the support table 23.

The description has been made above with respect to the case in which the pin 21 is the movable side and the support table 23 is the stationary side, with the shaft member 2 being moved in the axial direction. Conversely, the pin 21 may be the stationary side and the support table 23 may be the movable side, and the bearing sleeve 8 may be moved in the axial direction. In this case, the assembling device has a structure in which, after the upper end face 2b1 of the flange part 2b and the lower end face 8b of the bearing sleeve 8 have abutted each other as shown in FIG. 4, the cam 22, which has been abutted on the lower end face of the support table 23 such that the long diameter (x1) is parallel to the axial line, is rotated, so that the support table 23 is displaced downwards. Thereby, the predetermined dimension of the two thrust bearing gaps is achieved through the process similar to the above.

Furthermore, while the seal member 9 is secured to the bearing sleeve 8 after the bearing sleeve 8 is fixed to the housing 7 in the process flow described above, the process flow shown in FIG. 4 to FIG. 6 may be followed using a bearing sleeve 8 that includes the seal member 9 already attached to it. Also, while description has been made above with respect to the structure using a single bearing sleeve 8 for the bearing member, the manufacturing method according to the present invention can be applied to the structure that includes two or more bearing sleeves for the bearing member.

Furthermore, while the housing 7 has been described as being made of metal, the manufacturing method according to the present invention is certainly not limited to metal housings 7 but can favorably be applied to plastic housings 7.

Also, the manufacturing method according to the present invention is not limited to the fluid dynamic bearing device 1 having the structure shown in FIG. 2, but can also favorably be used for assembling the fluid dynamic bearing device of the type, for example, shown in FIG. 7.

In the example structure of the fluid dynamic bearing device shown in FIG. 2, the radial bearing parts R1 and R2 and thrust bearing parts T1 and T2 are described as having herringbone- or spiral-shape dynamic pressure generating grooves to generate dynamic pressure of the lubricating oil. Instead, so-called step bearings, multilobe bearings, or non-cylindrical bearings may be adopted for the radial bearing parts R1 and R2, and step bearings or wave journal bearings may be adopted for the thrust bearing parts T1 and T2. If a step bearing or a multilobe bearing is adopted for the radial bearing part, it may be provided at two axially spaced-apart locations as with the two radial bearing parts R1 and R2, or, it may be provided as one radial bearing part that extends over the upper and lower regions on the inner circumferential side of the bearing sleeve 8.

Also, while the lubrication fluid that fills the interior space of the fluid dynamic bearing device 1 (housing 7) has been described as lubricating oil above, other lubricants that have fluidity, such as air or other gasses, and magnetic fluids, or lubricating grease or the like, may also be used.

Figure 1:
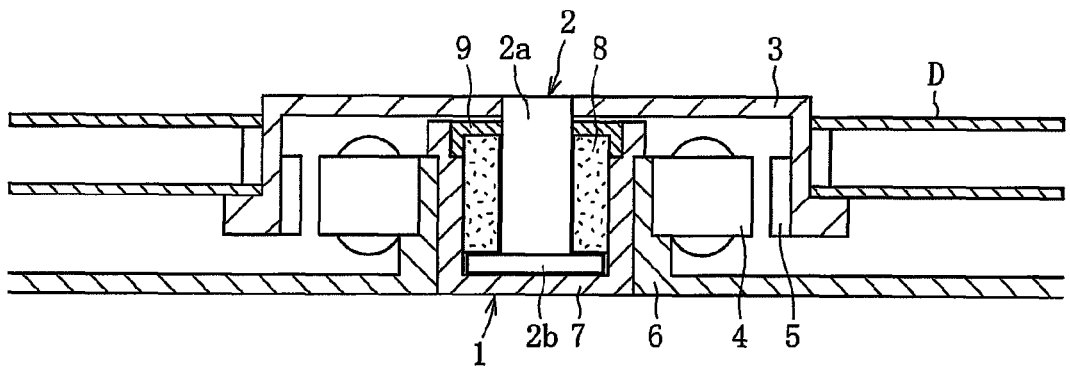
FIG. 1 is a conceptual cross-sectional view illustrating one example of a spindle motor for information equipment in which a fluid dynamic bearing device is incorporated.
Figure 2:
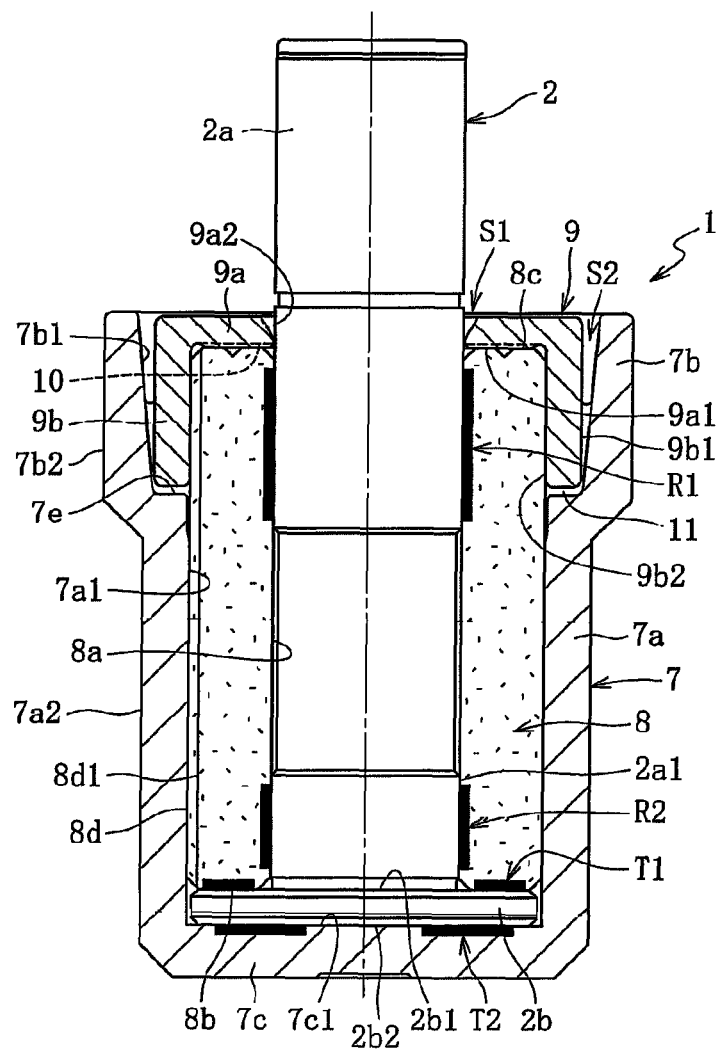
FIG. 2 is a cross-sectional view illustrating one embodiment of the fluid dynamic bearing device.
Figure 3:
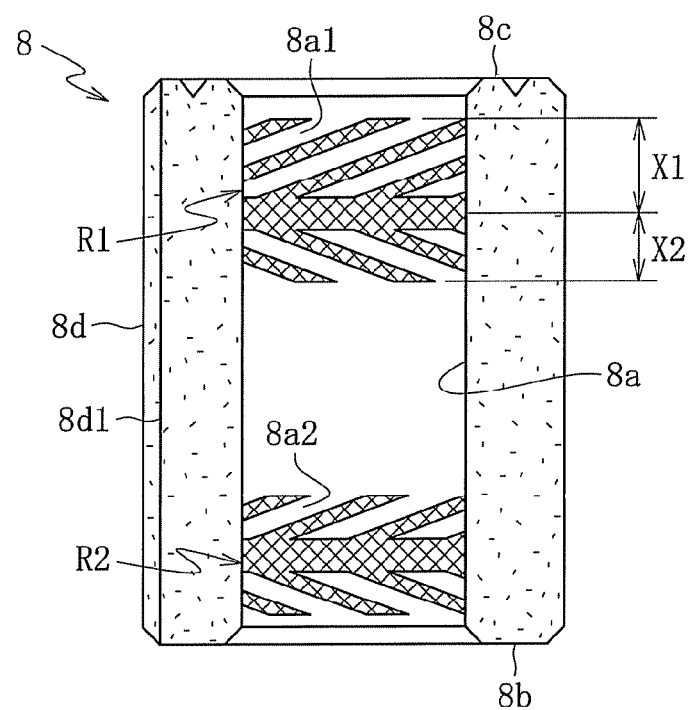
FIG. 3 is a cross-sectional view of a bearing sleeve.
Figure 4:
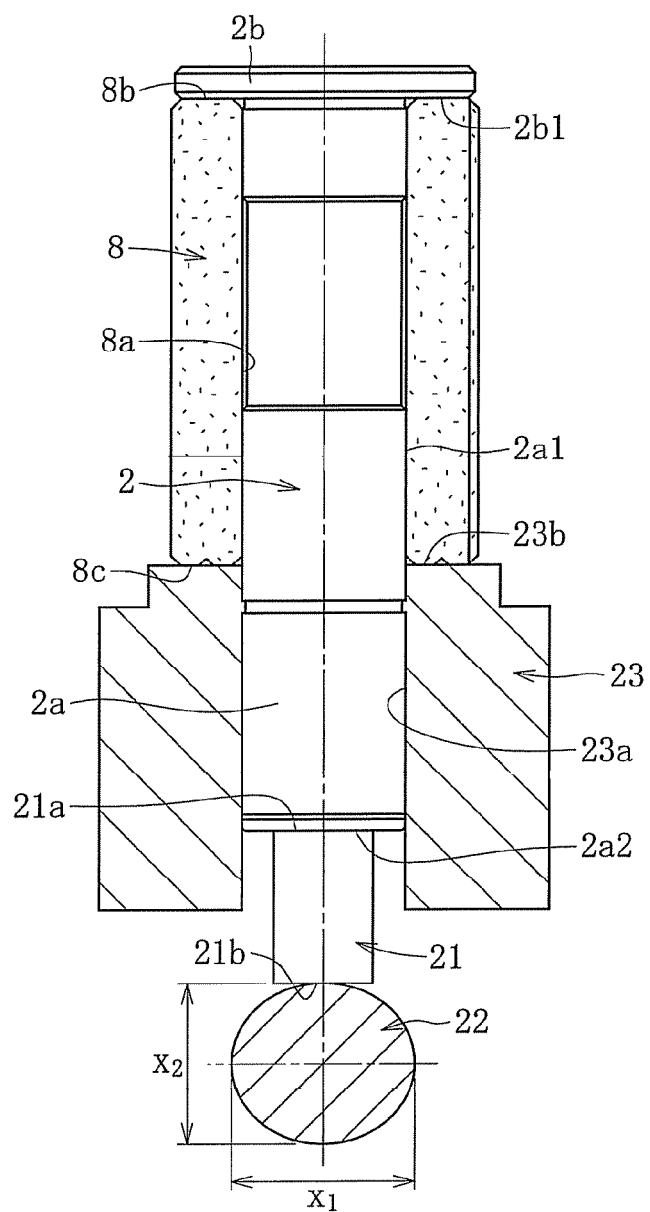
FIG. 4 is a conceptual cross-sectional view illustrating an assembling process step of the fluid dynamic bearing device of FIG. 2.
Figure 5:
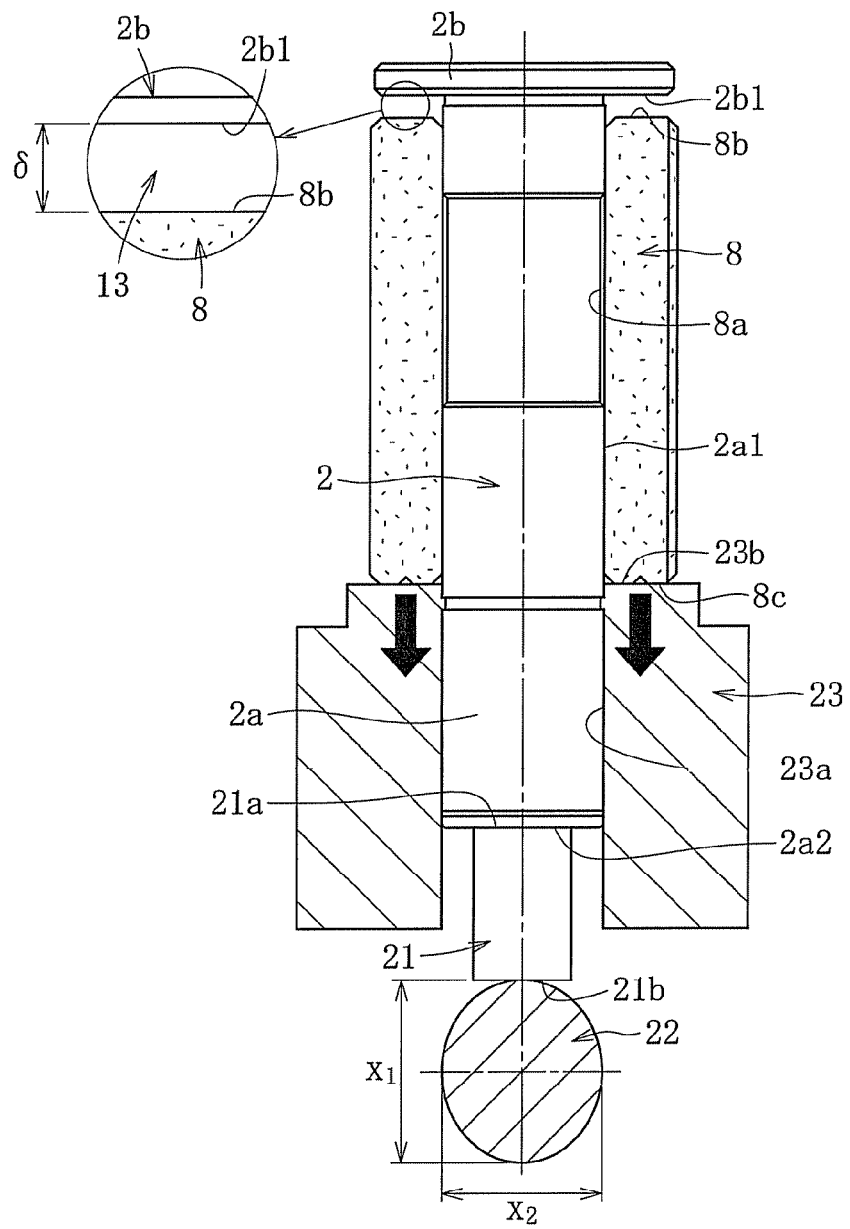
FIG. 5 is a conceptual cross-sectional view illustrating an assembling process step of the fluid dynamic bearing device of FIG. 2.
Figure 6:
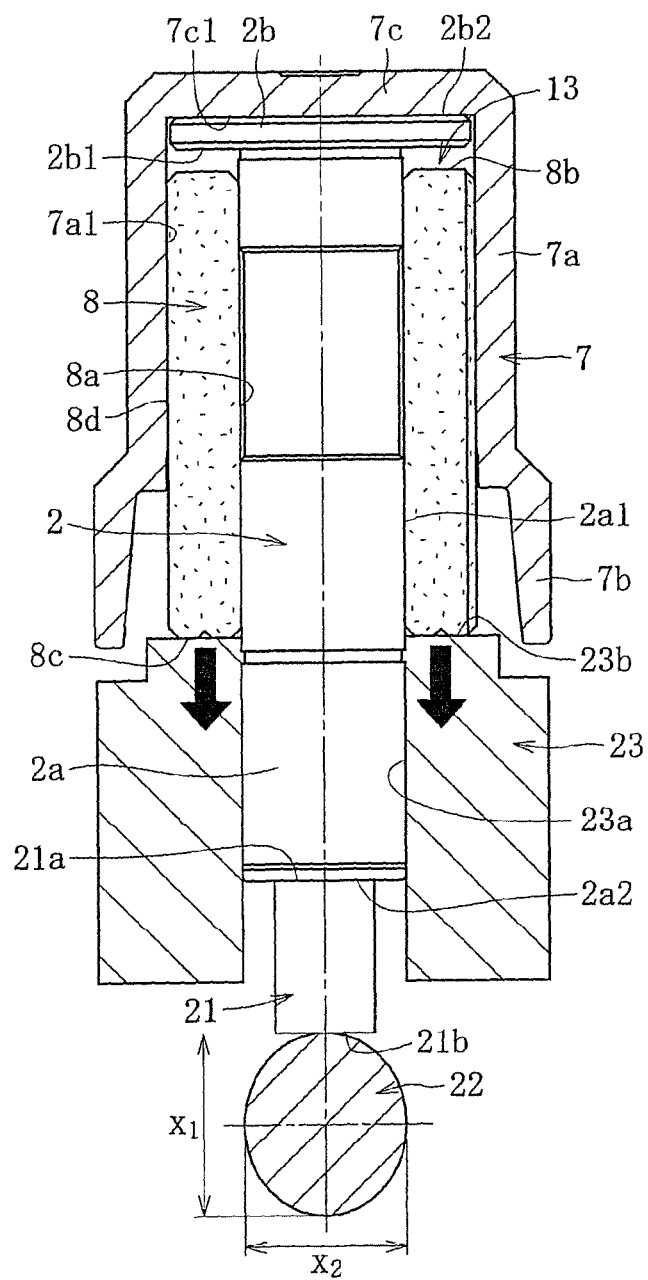
FIG. 6 is a conceptual cross-sectional view illustrating an assembling process step of the fluid dynamic bearing device of FIG. 2.
Figure 7:
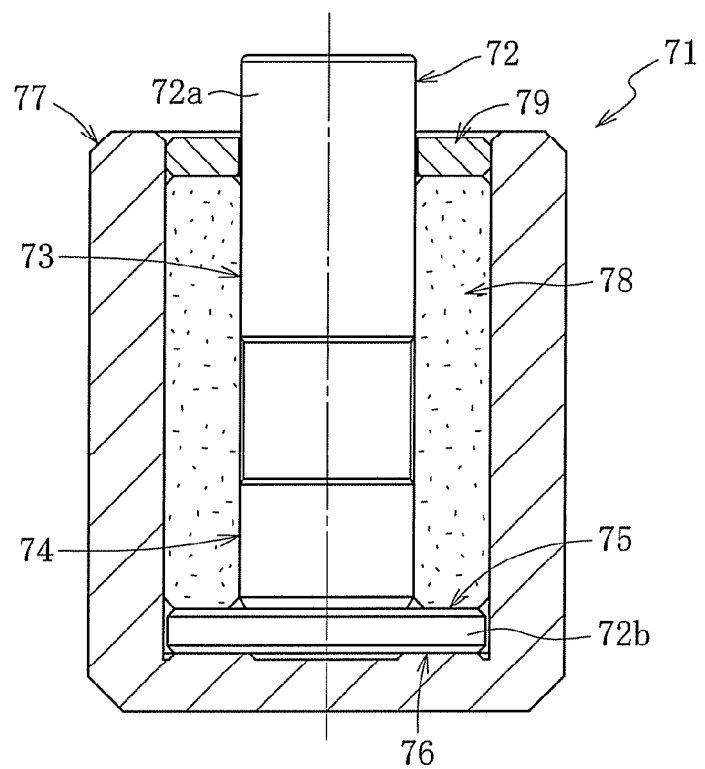
FIG. 7 is a conceptual cross-sectional view illustrating one example of a known fluid dynamic bearing device.

The invention claimed is:

1. A method for manufacturing a fluid dynamic bearing device, comprising:
configuring a bearing member and a shaft member such that an axial gap is formed between the bearing member and a first thrust bearing surface of the shaft member, the axial gap being substantially empty, then
inserting the shaft member and the bearing member into a housing having an integrally formed bottom, while maintaining said axial gap between the bearing member and the first thrust bearing surface of the shaft member, and then
fixing the bearing member to an inner circumference of the housing at the time point when a second thrust bearing surface of the shaft member makes contact with the bottom of the housing,
wherein said axial gap between the bearing member and first thrust surface of the shaft member is equal to the sum of (i) a first thrust bearing gap between the bearing member and the first thrust bearing surface of the shaft member and (ii) a second thrust bearing gap between the second thrust bearing surface of the shaft member and the housing, in the fluid dynamic bearing device.

2. The method for manufacturing a fluid dynamic bearing device according to claim 1, wherein the bearing member is bonded to the housing with a gap fit.

3. The method for manufacturing a fluid dynamic bearing device according to claim 1, wherein the axial gap is formed by relatively moving the shaft member and the bearing member in an axial direction from a state in which the first thrust bearing surface of the shaft member makes contact with the bearing member.

4. The method for manufacturing a fluid dynamic bearing device according to claim 3,
wherein one of the shaft member and the bearing member is supported by a rotatable cam, and
wherein said axial gap is formed by relatively moving the one of the shaft member and the bearing member in the axial direction, relative to the other of the shaft member and the bearing member by rotating the cam, thereby switching between (1) the state in which the first thrust bearing surface of the shaft member makes contact with the bearing member and (2) a state in which the axial gap is formed between the first thrust bearing surface of the shaft member and the bearing member.

* * * * *